Oct. 9, 1923.

A. A. SCHUPP 1,470,034

METHOD OF MAKING POPPET VALVES

Filed Jan. 24, 1921

Arthur A. Schupp INVENTOR

BY Geo. B. Willcox ATTORNEY

Patented Oct. 9, 1923.

1,470,034

UNITED STATES PATENT OFFICE.

ARTHUR A. SCHUPP, OF SAGINAW, MICHIGAN, ASSIGNOR TO WILCOX MOTOR & MANUFACTURING CO., OF SAGINAW, MICHIGAN, A CORPORATION OF MICHIGAN.

METHOD OF MAKING POPPET VALVES.

Application filed January 24, 1921. Serial No. 439,473.

*To all whom it may concern:*

Be it known that I, ARTHUR A. SCHUPP, a citizen of the United States, residing at Saginaw, in the county of Saginaw and State of Michigan, have invented certain new and useful Improvements in Methods of Making Poppet Valves; and I do hereby declare the following to be a full, clear, and exact description of the invention, such as will enable others skilled in the art to which it appertains to make and use the same.

This invention relates to poppet valves and pertains more particularly to an improved method of securing the steel stems of poppet valves to the heads, which are preferably made of cast iron or other suitable material.

The objects of my invention are first to provide a poppet valve construction that is simple and inexpensive to manufacture, that will provide a gas-tight union between the head and the stem and that will avoid any tendency for the stem to shift longitudinally with respect to the head when the stem is welded to the head.

With these and certain other objects in view which will appear later in the specification, my invention comprises the method described and claimed, and the equivalents thereof.

Figure 1:
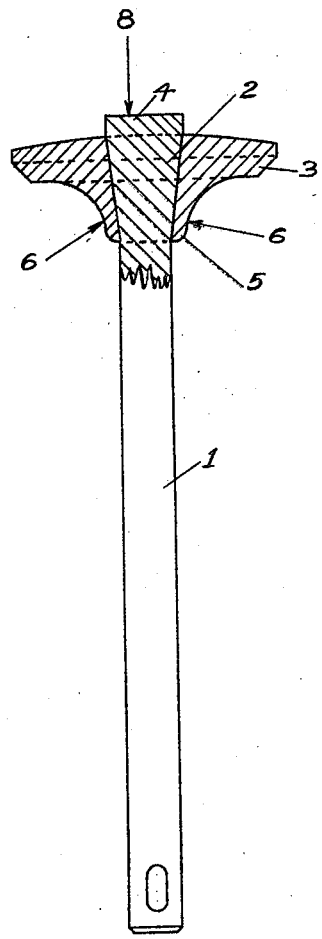

In the drawings, Fig. 1 is a part sectional side elevation of a poppet valve showing a preferred form of construction of the connection between the head and stem.

Figure 2:
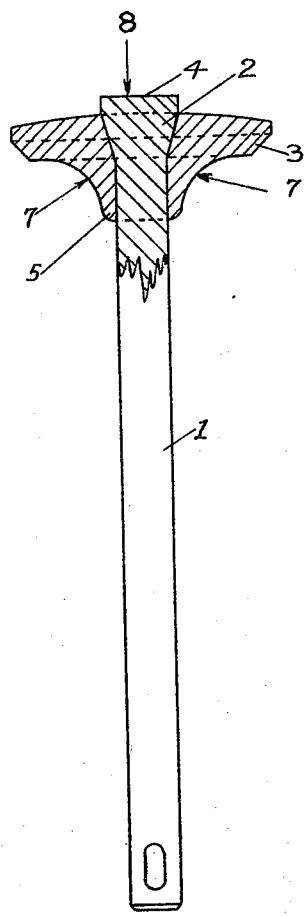

Fig. 2 is a similar view showing a modified form of construction.

As is clearly shown in the drawings, the device consists in a stem 1, which may be made of steel or other suitable material, the upper end of the stem being enlarged or upset as at 2, to form an enlarged conical part.

This conical part is preferably received in a tapered aperture formed within the head 3 to receive the enlarged part of the stem by a tight close fit.

The upper end of the stem preferably projects above the upper face of the head 3, as at 4.

The stem and head having been formed as above described, they are assembled together as shown in Figs. 1 and 2 and then welded by an electric welding process.

The lower electrodes of the electric welding machine—not shown—are applied to the boss 5 of the head, preferably at a point near the lower end of the tapered part 2 of the stem, the preferred point of application of the lower electrodes being indicated in Fig. 1 as at 6, 6 and in Fig. 2 as at 7, 7. The other electrode is applied, as at 8, to the projecting end 4 of the stem 1, and the welding current, taking the path of least resistance, passes through the boss 5 and into the tapered part 2 of the stem 1, thereby melting the contiguous tapered surfaces of the head and stem. Simultaneously pressure is applied by the electrode upon the end 4 of the stem, forcing the two tapered surfaces of the head and stem into intimate contact while those surfaces are in a state of flux.

If the electrode were applied at the extreme lower end of the boss 5, that is, at a point below that indicated by the arrows 6—6, the tapered stem might settle slightly into the bore of the head 3, under the influence of the pressure of the electrode, and this pressure, together with the outward pressure produced by the expansion of the heated tapered part 2 of the stem, would force the two molten surfaces together under very high pressure, producing a thorough union of the two metals.

The tapered surfaces, however, prevent any considerable longitudinal movement of the stem with relation to the head, so that the predetermined length of the finished valve measured from the top of the head to the lower end of the stem is practically constant in any number of valves made in quantities on a production basis. Even such slight longitudinal movement as above described may be avoided by applying the electrode at a point on the boss 5 above the lower end of the taper, as at the arrows 6—6. The lower part of the tapered surface in this instance does not melt and consequently prevents any lengthwise movement.

Since the taper not only assists in forming a tight union between the molten surfaces, but also prevents any undesirable lengthening of the completed valve, it is possible to assemble large quantities of these valves rapidly and accurately, with the assurance that the finished overall length of all of the valves of a manufactured lot of valves will be practically uniform.

After the welding operation is completed, the head is faced and ground as usual.

In Fig. 1 I have shown a tapered part 2 extending through the entire thickness of the head and its boss.

In Fig. 2 I have shown a modified form of construction, in which the taper of the stem extends only part way through the length of the bore of the head.

Having thus described my invention, what I claim and desire to secure by Letters Patent is:

1. The method of welding valve stems to valve heads, which comprises forming the stem with an enlarged tapered end, forming in the head a tapered aperture to receive and closely fit the tapered part of said stem, assembling the stem and head with the outer end of the stem projecting beyond the face of the head to form an electric contact member, and finally fluxing the contiguous surfaces only of said head and stem by electric welding while simultaneously applying pressure to the end of said stem.

2. The method of welding valve stems to valve heads, which comprises forming the stem with an enlarged end, forming in the head an aperture shaped to receive and closely fit the enlarged end of said stem, assembling the stem and head with the outer end of the stem projecting beyond the face of the head to comprise an electric contact member, and finally fluxing the contiguous surfaces only of said head and stem by electric welding while applying pressure to the end of said stem and to the opposite face of said head.

In testimony whereof I affix my signature.

ARTHUR A. SCHUPP.